(12) United States Patent
Fellmeth et al.

(10) Patent No.: US 9,726,159 B2
(45) Date of Patent: Aug. 8, 2017

(54) ARRANGEMENT FOR THROTTLING A FLUID FLOW, AND CORRESPONDING PISTON PUMP FOR DELIVERING FLUIDS

(75) Inventors: Reiner Fellmeth, Besigheim (DE); Juergen Haecker, Schwieberdingen (DE); Oliver Gaertner, Abstatt (DE); Heiko Jahn, Tamm (DE); Marc Zimmermann, Sonthofen (DE); Wolfgang Schuller, Cleebronn (DE); Harald Hermann, Friolzheim (DE); Rolf Stotz, Vaihingen (DE); Daniel Gosse, Berlin (DE)

(73) Assignee: Robert Bosch GmbH, Stuttgart (DE)

( * ) Notice: Subject to any disclaimer, the term of this patent is extended or adjusted under 35 U.S.C. 154(b) by 667 days.

(21) Appl. No.: 13/819,865

(22) PCT Filed: Jul. 6, 2011

(86) PCT No.: PCT/EP2011/061391
§ 371 (c)(1),
(2), (4) Date: Jul. 15, 2013

(87) PCT Pub. No.: WO2012/028362
PCT Pub. Date: Mar. 8, 2012

(65) Prior Publication Data
US 2013/0287609 A1  Oct. 31, 2013

(30) Foreign Application Priority Data
Sep. 2, 2010  (DE) .................. 10 2010 040 167

(51) Int. Cl.
*F04B 7/02*  (2006.01)
*F04B 1/04*  (2006.01)
(Continued)

(52) U.S. Cl.
CPC ............. *F04B 7/02* (2013.01); *B60T 8/4031* (2013.01); *F04B 1/0465* (2013.01);
(Continued)

(58) Field of Classification Search
CPC .. F04B 53/102; F04B 53/103; F04B 53/1032; F04B 53/1035; F04B 49/22; F04B 23/02;
(Continued)

(56) References Cited

U.S. PATENT DOCUMENTS 4,246,932 A * 1/1981 Raines .................... A61M 5/31
  137/512
4,966,199 A * 10/1990 Ruschke ............... F16K 15/141
  137/843

(Continued)

FOREIGN PATENT DOCUMENTS

DE          24 23 438 A1   11/1975
DE   10 2006 027 555 A1   12/2007
(Continued)

OTHER PUBLICATIONS

International Search Report corresponding to PCT Application No. PCT/EP2011/061391 mailed Mar. 12, 2012 (German and English language document) (5 pages).

*Primary Examiner* — Theodore Stigell
*Assistant Examiner* — Chirag Jariwala
(74) *Attorney, Agent, or Firm* — Maginot, Moore & Beck LLP

(57) ABSTRACT

An arrangement for throttling a fluid flow includes a throttle element arranged so as to influence a flow cross section in a fluid duct. The throttle element has a resiliently elastic disc-shaped basic body which is arranged with a top side and a bottom side between at least two supports in the fluid duct. The body is arranged in such a way that the flow cross section can be variably adjusted as a function of a pressure
(Continued)

difference between the top side and the bottom side of the resiliently elastic disc-shaped basic body. At least one support bears against the top side of the resiliently elastic disc-shaped basic body, and at least one support bears against the bottom side of the resiliently elastic disc-shaped basic body.

18 Claims, 6 Drawing Sheets

(51) Int. Cl.
  F04B 11/00 (2006.01)
  F04B 49/22 (2006.01)
  F04B 53/10 (2006.01)
  B60T 8/40 (2006.01)

(52) U.S. Cl.
  CPC ........ F04B 11/0033 (2013.01); F04B 49/225 (2013.01); F04B 53/1032 (2013.01); Y10T 137/7762 (2015.04)

(58) Field of Classification Search
  CPC .... F04B 41/02; F04B 39/0055; F04B 1/0404; F04B 11/0033; F04B 11/0091; F04B 49/225; F04B 49/24; F04B 53/10; F04B 53/1022; F04B 53/1037–53/1097; F16K 15/044; F16K 15/046; F16K 17/046; F16K 17/0493; B60T 8/4068; B60T 8/4031
  USPC ........................................................ 417/441
  See application file for complete search history.

(56) References Cited

U.S. PATENT DOCUMENTS

| | | | | |
|---|---|---|---|---|
| 5,078,241 A * | 1/1992 | Ackermann | ..... | B60G 17/01941 188/266.7 |
| 5,199,860 A * | 4/1993 | Stegmaier | ............ | B60T 8/4031 137/533.17 |
| 5,857,665 A * | 1/1999 | Beck | ........................ | F16F 9/06 188/322.14 |
| 6,182,698 B1 * | 2/2001 | Barak | .................... | F16K 15/147 137/512 |
| 7,004,733 B2 * | 2/2006 | Schepp | ................. | B60T 8/4031 417/470 |
| 2004/0234400 A1 | 11/2004 | Schepp et al. | | |
| 2008/0029939 A1* | 2/2008 | Beck | .................... | B60G 17/044 267/64.17 |
| 2008/0317618 A1* | 12/2008 | Kim | ...................... | B60T 8/4031 417/540 |

FOREIGN PATENT DOCUMENTS

| | | |
|---|---|---|
| DE | 10 2008 002 740 A1 | 12/2009 |
| EP | 0 881 387 A2 | 12/1998 |
| JP | 168658 | 5/1955 |
| JP | 50-156005 A | 12/1975 |
| JP | 53-105726 A | 9/1978 |
| JP | 11-504292 A | 4/1999 |
| JP | 11-159641 A | 6/1999 |
| JP | 31-15189 | 11/2005 |
| JP | 2006-255415 A | 9/2006 |
| WO | 01/47583 A1 | 5/2001 |
| WO | 03/004872 A1 | 1/2003 |

* cited by examiner

Fig. 19
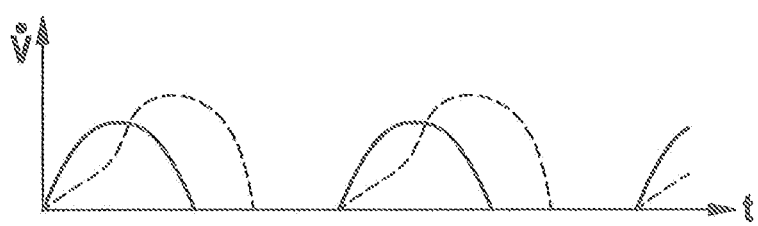
Fig. 20
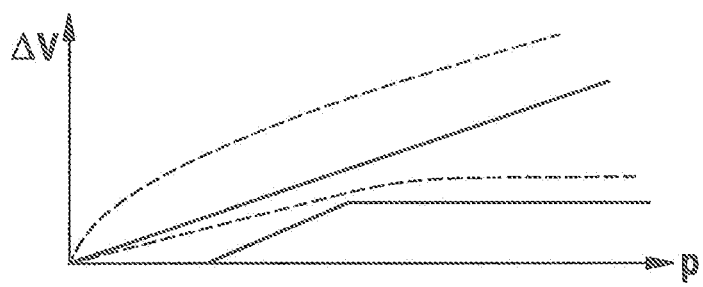
Fig. 21
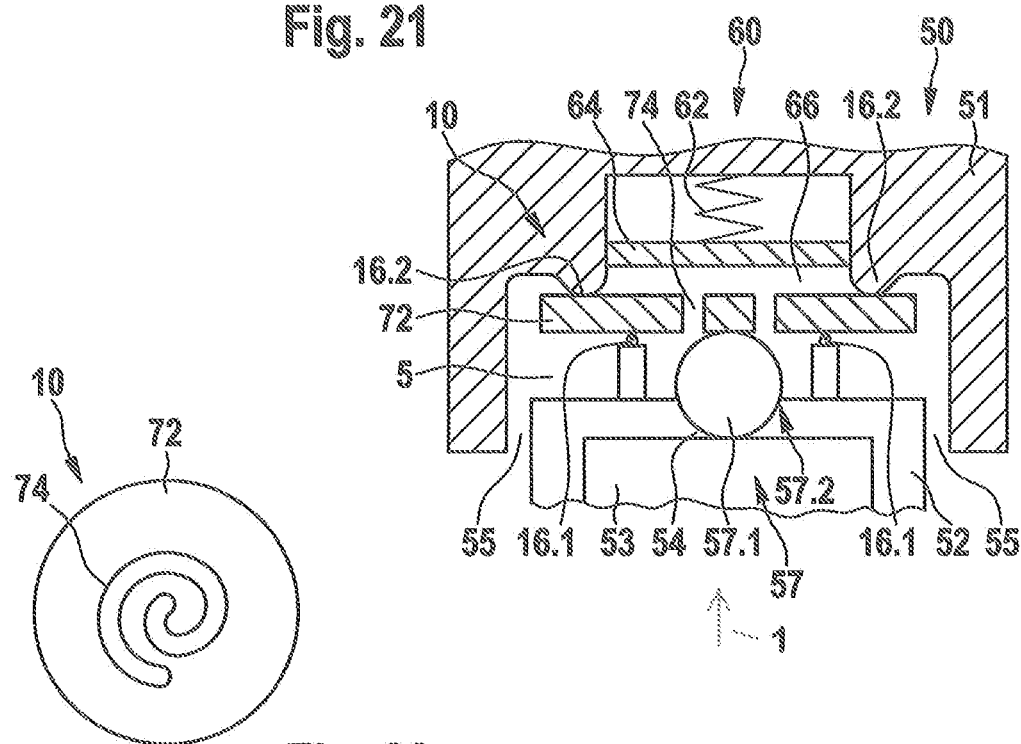
Fig. 22

ARRANGEMENT FOR THROTTLING A FLUID FLOW, AND CORRESPONDING PISTON PUMP FOR DELIVERING FLUIDS

This application is a 35 U.S.C. §371 National Stage Application of PCT/EP2011/061391, filed on Jul. 6, 2011, which claims the benefit of priority to Serial No. DE 10 2010 040 167.6, filed on Sep. 2, 2010 in Germany, the disclosures of which are incorporated herein by reference in their entirety.

BACKGROUND

The disclosure is based on an arrangement for throttling a fluid flow of the type according to the description below. The present disclosure also relates to a piston pump for delivering fluids, said piston pump comprising such a throttle device.

Different embodiments of piston pumps are known from the prior art. For example, radial piston pumps having a plurality of pump elements for conveying pressurized agents and in which at least one piston can be moved to and fro by means of a cam are often used in vehicle braking systems. These "pump elements" typically consist of a piston, a piston sliding surface often formed as a cylinder, inlet and outlet valves, and seal elements. The valves are used for fluid control during the pumping movement of the piston. In this case, the inlet valve is used to ensure that fluid cannot flow back into the intake chamber during the compression phase. The outlet valve prevents the backflow of fluid from the delivery side into the interior of the pump and is typically housed in the lid of the pump. At least one throttle arrangement is provided to throttle the fluid flow after the outlet valve in order to optimize noise and pulsation.

A piston pump for brake pressure regulation in a hydraulic vehicle braking system is described for example in Offenlegungsschrift DE 10 2008 002 740 A1. The described piston pump comprises a pump housing, a receiving bore, arranged in the pump housing, for the piston pump and a valve lid, which closes the receiving pump outwardly and in which an outlet valve and first and second conduit portions of an outflow conduit are housed. The outflow geometry influences the noise behavior of the piston pump and is therefore usually formed with a suitable tapering of the outflow conduit, which then provides a throttle effect.

For example, a piston pump with reduced noise development is described in Offenlegungsschrift DE 10 2006 027 555 A1. The described piston pump for conveying fluids comprises a piston, a cylinder element and a pressure chamber, which is arranged between an inlet valve and an outlet valve and is closed by a lid, wherein the outlet valve comprises a closing body formed as a ball, a biasing device acting on the closing body and formed as a spiral spring, a base element for supporting the biasing device and a disk element, and wherein a seal seat of the outlet valve is arranged on the disk element. The use of the disk element is intended to ensure that component tolerances of various components of the piston pump cannot have a negative effect on the outlet valve.

SUMMARY

By contrast, the arrangement according to the disclosure for throttling a fluid flow having the features described below has the advantage that a reduction of pulsations in a fluid system is possible as a result of a variable throttle cross section with the simplest, cost-effective, machine-produced components that can be reliably assembled and with robust configuration, said arrangement being less sensitive to component and assembly tolerances than previously known throttle arrangements of variable cross section. As a result of embodiments of the present disclosure, component tolerances are not translated into tolerances of the flow cross section, but into negligible small differences in the opening behavior of the throttle arrangement by means of a parallel shift of the throttle characteristic curve.

The core of the disclosure is a throttle element having a resilient main body in the form of a disk. This has a first opening, through which fluid can flow. The main body may have various cross sections and for example may be formed as a disk spring and/or leaf spring. In addition, collars and/or shoulders may be arranged on the disk-shaped main body so that other shapes, such as a main body that is hat-shaped and/or cap-shaped in cross section, are formed. The main body is preferably radially symmetrical, but may also be formed as an angular disk. The throttle element is installed in the fluid duct in such a way that it bears against a support from either side. There is a predefined distance between the two supports. The throttle element may be biased in a defined manner in the installed state between the supports, whereby a defined opening pressure is produced. If there is a pressure difference between the upper side and underside of the element and this is strong enough to overcome the defined opening pressure of the bias, the throttle element thus detaches from the support on the side of greater pressure and carries out a stroke motion, as a result of which a flow cross section is produced, via which a pressure compensation takes place.

The throttle element bears against the supports preferably in an interlocking manner, whereby a sealing effect in the form of a line or surface seal is produced. In addition, it is possible to release a defined, constant flow cross section in the pressure-compensated state by means of a second opening. This corresponds to a parallel connection of a further throttle element with a constant cross section. The second opening can be produced for example by a recess in the supports, an annular gap and/or an opening in the throttle element in the form of a bore, a slit, etc. In this case, it is also possible to provide a directed forced outflow.

To increase the service life of the throttle element, a stop may be provided that defines the opening stroke. A fluidic end position damper may further optimize the opening and noise behavior in the region of this stop.

Embodiments of the present disclosure provide an arrangement for throttling a fluid flow, said arrangement having a variably adjustable opening cross section, so as to implement a progressive opening behavior or a digressive increase in the flow resistance with increasing flow in a fluid duct. This enables heavy throttling at low flow rates as well as low flow resistance at greater flow rates, which advantageously results in a good level of efficiency. The disclosure describes possible configurations of the throttle element that can be produced by simple, machine-produced components that can be reliably produced and assembled.

Embodiments of the arrangement according to the disclosure for throttling a fluid flow can advantageously be arranged connected in parallel and/or series to a fluid pump, a fluid valve or another fluid element, which causes pulsations, that is to say changes in the volume flow over time, in the fluid system. Embodiments of the arrangement according to the disclosure for throttling a fluid flow are preferably used in assemblies for hydraulic brake modulation, such as ABS (anti-lock braking system), ESP (electronic stability program), an electro-hydraulic braking system and similar devices in vehicle braking systems for reducing hydraulic pulsations, which can be transferred to other components as far as the vehicle interior, or in the worst case cause "jerking", that is to say changes in longitudinal acceleration, and "pitching" of the vehicle.

An arrangement according to the disclosure for throttling a fluid flow comprises a throttle element, which is arranged in a fluid duct to influence a flow cross section. In accordance with the disclosure the throttle element has a resilient disk-shaped main body, which is arranged via its upper side and underside between at least two supports in the fluid duct, such that the flow cross section can be variably adjusted according to the pressure difference between the upper side and underside of the resilient disk-shaped main body, at least one support bearing against the upper side of the resilient disk-shaped main body and at least one support bearing against the underside of the resilient disk-shaped main body.

A piston pump according to the disclosure for delivering fluids comprises a piston, a cylinder element and a pressure chamber, which is arranged between an inlet valve and an outlet valve and is closed by a lid, an arrangement according to the disclosure for throttling a fluid flow being provided after the outlet valve in the direction of fluid flow.

Advantageous improvements of the arrangement disclosed in the description below for throttling a fluid flow are possible as a result of the measures and developments disclosed below.

It is particularly advantageous that the resilient disk-shaped main body has a first opening through which a fluid can flow, fluid flowing either through the first opening in the resilient disk-shaped main body or around the resilient disk-shaped main body when one side of the resilient disk-shaped main body is lifted.

In an advantageous embodiment of the arrangement according to the disclosure a second opening that has a defined constant flow cross section and is released independently of the differential pressure is provided. The second opening may be introduced into the resilient disk-shaped main body for example and/or as a recess in the at least two supports and/or may be formed as an annular gap.

In a further advantageous embodiment of the arrangement according to the disclosure the resilient disk-shaped main body is arranged under a defined bias between the at least two supports, such that an opening differential pressure is predefined, the at least two supports being arranged at a predefinable distance from one another. The pressure difference lifts the resilient disk-shaped main body from the at least one support on the side of greater pressure, such that the resilient disk-shaped main body carries out a stroke motion and increases the flow cross section.

In a further advantageous embodiment of the arrangement according to the disclosure the resilient disk-shaped main body bears against the at least two supports in an interlocking manner and forms a surface seal and/or line seal.

The throttle behavior of the throttle element can be changed for example by changing the constant cross section of the second opening and/or the rigidity and/or spring characteristic curve and/or load-displacement characteristic curve of the resilient disk-shaped main body and/or the response pressure and/or the bias, and/or by changing a stroke delimitation.

In a further advantageous embodiment of the arrangement according to the disclosure an element with a volume that can be changed according to pressure and/or a throttle device of constant cross section and/or a check valve may be provided, which are arranged so as to be fluidically connected in series and/or parallel to the throttle element. A variable volume arranged before the throttle element in the direction of flow may be formed for example as a pressure-dependent resilient volume in the form of a compressible gas volume. Such a resilient volume can be used over a relatively large pressure range to damp the pulsations in the fluid duct. Conversely, the compressible volume of the damping element can thus be reduced with a constant pressure range to be damped. The throttle element may be arranged after a volume flow source and a resilient volume in the direction of flow. The volume flow source may be a reciprocating pump, a gear pump or another element, for example, that causes the volume flow to change over time. The resilient volume temporarily stores the volume available as a result of the excess pressure at the throttle element in accordance with its pressure-volume characteristic curve. The resilient volume can be produced for example by the inherent resilience of the fluid system, a piston accumulator with return spring, a gas pressure accumulator, a bellows, a diaphragm spring or similar components, of which the volume increases under the influence of pressure. Due to the variable throttle cross section of the arrangement according to the disclosure for throttling a fluid flow, a greater excess pressure can be generated in the range of small volume flows and the volume of the resilient volume can be increased. A smaller residual ripple/amplitude spectrum is thus provided at the outlet of the fluid system. The losses at the throttle as a result of the progressive characteristic curve profile thereof are minimized in the range of large volume flows.

In a further advantageous embodiment of the arrangement according to the disclosure the resilient disk-shaped main body is formed as a return spring for a closing element of a valve. A multifunctional element that is optimized in terms of installation space can thus advantageously be produced.

Exemplary embodiments of the disclosure are illustrated in the drawings and will be explained in greater detail in the following description. In the drawings, identical reference signs denote components or elements that perform identical or similar functions.

BRIEF DESCRIPTION OF THE DRAWINGS

FIG. 19 shows various volume flow rate/time characteristic curves of a fluid pump or pulsation source with a volume flow rate that is not constant over time.

FIG. 20 shows various volume change/pressure characteristic curves of an element of variable volume.

FIG. 21 shows a cross section through a rear region of a piston pump according to the disclosure for delivering fluids, comprising an arrangement according to the disclosure for throttling a fluid flow.

FIG. 22 shows a schematic plan view of an exemplary embodiment of a throttle element for the arrangement according to the disclosure for throttling a fluid flow from FIG. 21.

DETAILED DESCRIPTION

Figure 1:
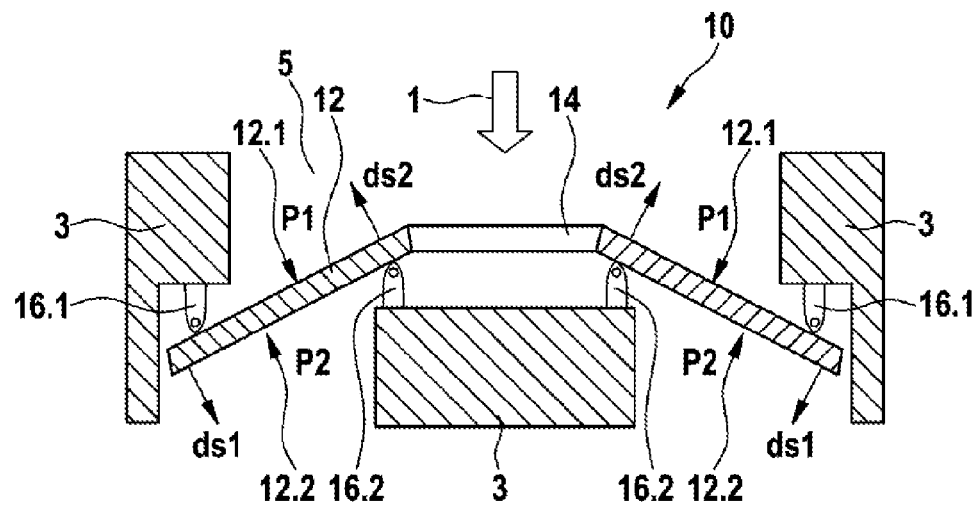
FIGS. 1 to 6 each show a schematic sectional illustration of an exemplary embodiment of an arrangement according to the disclosure for throttling a fluid flow.

Throttle arrangements in fluid ducts of constant cross section are known from the prior art. Variable cross sections are produced by valves that are actuated on the basis of a pressure difference or on the basis of external force and that are relatively complex and expensive. The known throttle devices have an approximately linear throttle characteristic curve, that is to say a linearly increasing flow resistance with increasing volume flow rate through the throttle cross section. In this case, check valves make it possible to shift the x-axis portion by determining an opening pressure. Electronically controlled throttle valves are very complex to produce due to a necessary detection of a valve lifter position.

Variable throttle arrangements with a defined flow cross section in the pressure-compensated state and defined opening behavior cannot generally be produced cost-effectively in the automotive industry due to the high demands on the functional range in terms of the temperature range, service life, etc. Component tolerances and assembly tolerances mean that throttle arrangements of variable cross section and parts adjacent thereto can only be reliably produced in a very cost-intensive manner.

As can be seen in FIGS. 1 to 6, an arrangement for throttling a fluid flow 1 comprises a throttle element 10, which is arranged in a fluid duct 5 to influence a flow cross section. In accordance with the disclosure the throttle element 10 has a resilient disk-shaped main body 12, 22, 32, 42, of which the upper side 12.1 and underside 12.2 are arranged between at least two supports 16.1, 16.2 in the fluid duct 1, such that the flow cross section can be variably adjusted according to the pressure difference between the upper side 12.1 and the underside 12.2 of the resilient disk-shaped main body 12, 22, 32, 42. In this case, at least one support 16.1, 16.2 bears against the upper side 12.1 of the resilient disk-shaped main body 12, 22, 32, 42 and at least one support 16.1, 16.2 bears against the underside 12.2 of the resilient disk-shaped main body 12, 22, 32, 42. In each of the exemplary embodiments illustrated, the side of the disk-shaped main body 12, 22, 32, 42 that is arranged above in the respective illustration and is subjected to a first pressure P1 is denoted as the upper side 12.1, whereas the side of the disk-shaped main body 12, 22, 32, 42 that is arranged beneath in the respective illustration and is subjected to a second pressure P2 is denoted as the underside 12.1. The fluid duct 5 is defined by duct walls 3, on which the supports 16.1, 16.2 for the throttle element 10 are also arranged accordingly. In addition, in the exemplary embodiments illustrated the direction of flow of the fluid flow 1 is from top to bottom, wherein a first pressure P1 prevails above the throttle element 10 and a second pressure P2 prevails below the throttle element 10, such that a differential pressure $\Delta p = P1 - P2$ bears against the throttle element 10.

Figure 2:
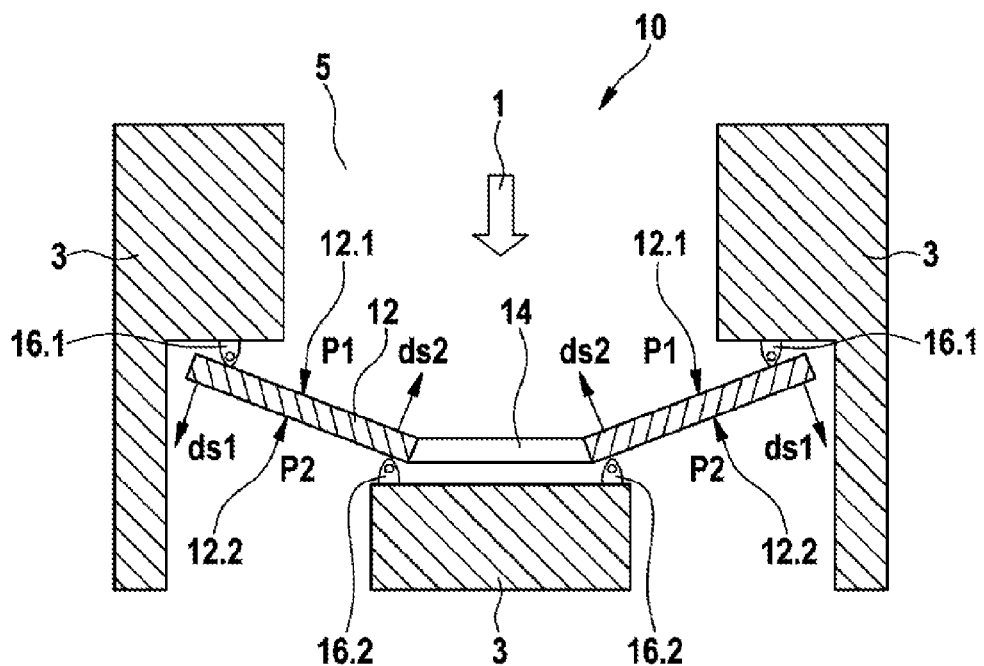
Figure 3:
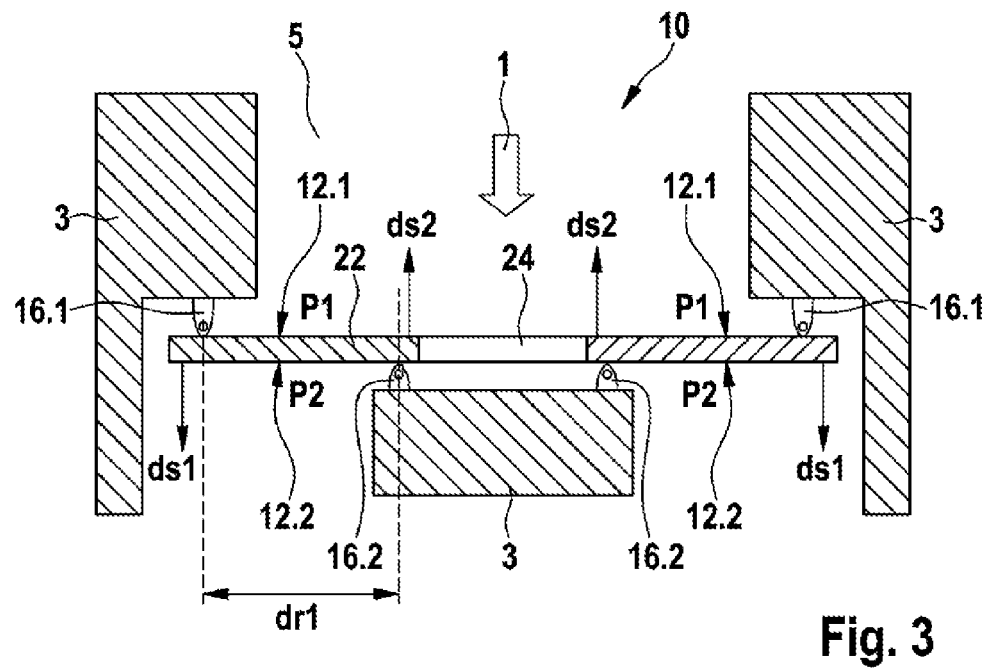

As can also be seen in FIGS. 1 to 6, the illustrated exemplary embodiments of the throttle element 10 each have, in the resilient disk-shaped main body 12, 22, 32, 42, a first opening 14, 24, 34, 44 through which fluid can flow, wherein the cross sections of the various exemplary embodiments may have various shapes. Fluid thus flows around the resilient disk-shaped main body 12, 22, 32, 42 when an upper side 12.1 of the resilient disk-shaped main body 12, 22, 32, 42 is raised, whereas fluid flows through the first opening 14, 24, 34, 44 in the resilient disk-shaped main body 12, 22, 32, 42 when the underside 12.2 of the resilient disk-shaped main body 12, 22, 32, 42 is raised. The resilient disk-shaped main body 12, 22, 32, 42 is arranged in the illustrated exemplary embodiment under a defined bias between the at least two supports 16.1, 16.2, such that an opening differential pressure is predefined. The at least two supports 16.1, 16.2 are arranged at a predefinable distance dr1 from one another, wherein the predefined distance dr1 predefines the leverages of the throttle element 10. The distance dr1 between a first support 16.1 and a second support 16.2 is illustrated in FIG. 3 representatively for all exemplary embodiments. When the predefined opening differential pressure has been reached, the pressure difference at the throttle element 10 lifts the resilient disk-shaped main body 12, 22, 32, 42 from the at least one support 16.1, 16.2 on the side 12.1, 12.2 of greater pressure P1, P2, such that the resilient disk-shaped main body 12, 22, 32, 42 carries out a stroke motion ds1 or a stroke motion ds2 and increases the flow cross section.

In the exemplary embodiments illustrated in FIGS. 1 and 2, the resilient main body 12 of the throttle element 10 is formed as a disk spring with a first opening 14. As can also be seen from FIG. 1, in the illustrated exemplary embodiment an outer side, formed as the upper side 12.1, of the main body 12 formed as a disk spring bears against a peripheral first support 16.1, wherein an inner side, formed as an underside, of the main body 12 formed as a disk spring bears against a second bearing 16.2. In contrast to FIG. 1, in the exemplary embodiment illustrated in FIG. 2 the inner side, formed as the upper side 12.1, of the main body 12 formed as a disk spring bears against the peripheral first support 16.1, wherein an outer side, formed as an underside 12.2, of the main body 12 formed as a disk spring bears against the second support 16.2. Due to the different installation of the main body formed as a disk spring 12, a different dynamic throttling behavior can be achieved using the same throttle element 10.

In the exemplary embodiment illustrated in FIG. 3 the resilient main body 22 of the throttle element 10 is formed as a flat disk with a first opening 24. A throttle element 10 with a main body 22 formed as a flat disk demonstrates the same dynamic throttle behavior irrespective of the position of installation, in contrast to the main body 12 formed as a disk spring.

Figure 4:
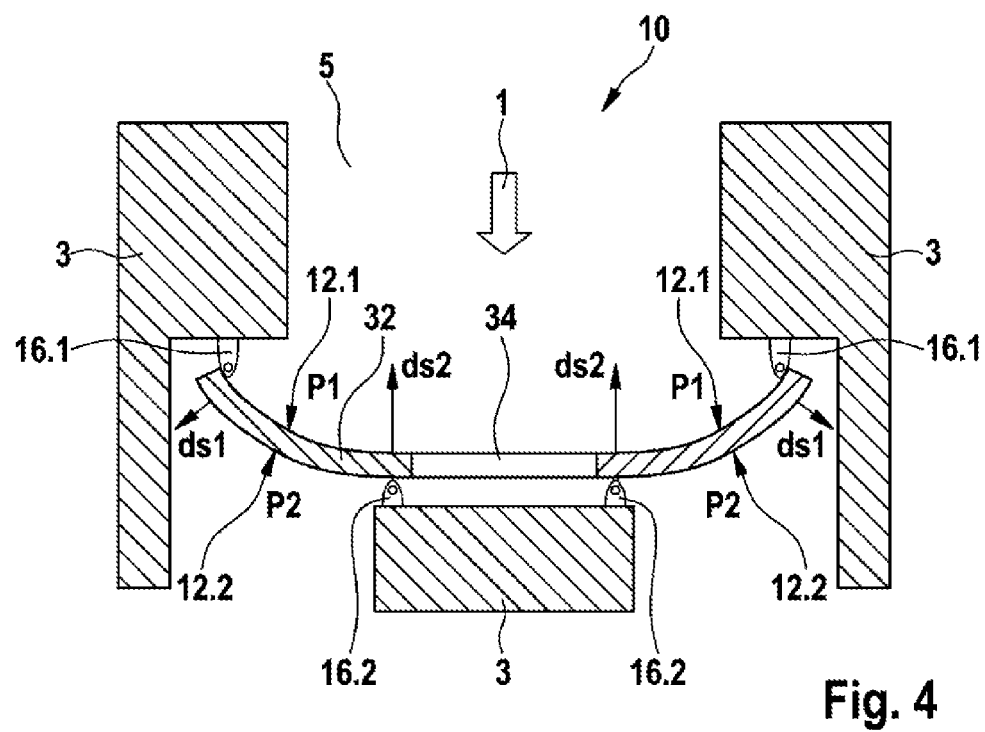

In the exemplary embodiment illustrated in FIG. 4 the resilient main body 32 of the throttle element 10 is formed as a cap-shaped disk with a first opening 34. Similarly to the throttle element 10 with the main body 12 formed as a disk spring, the throttle element 10 with the main body 32 formed as a cap-shaped disk also demonstrates different dynamic throttle behavior depending on the position of installation.

Figure 5:
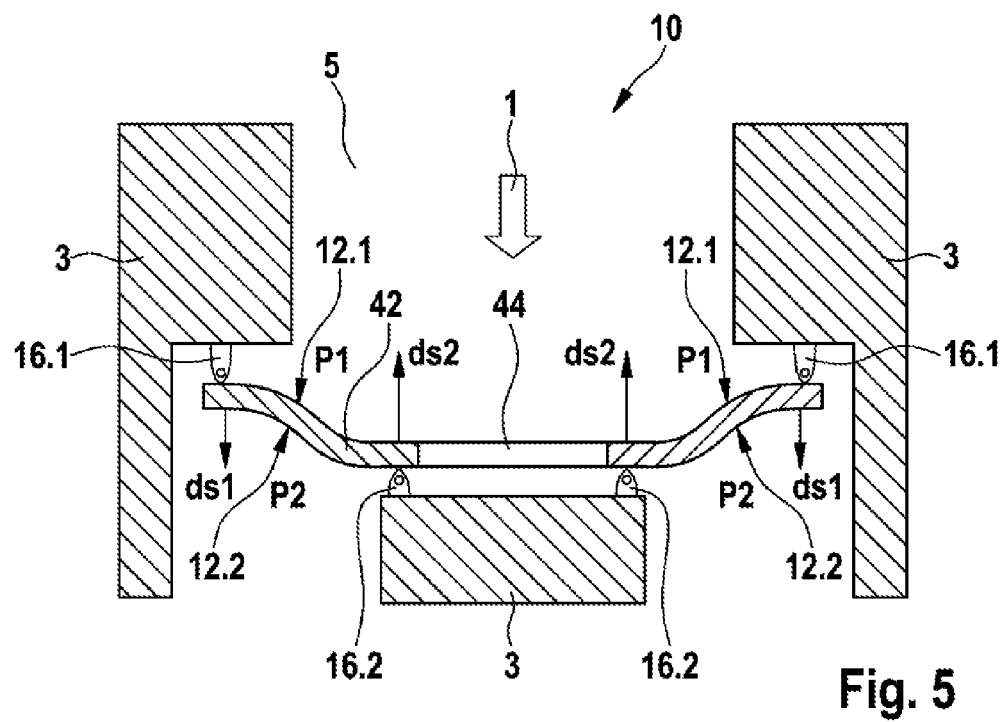

In the exemplary embodiment illustrated in FIG. 5 the resilient main body 42 of the throttle element 10 is formed as a hat-shaped disk with a first opening 44. Similarly to the throttle element 10 with the main body 12 formed as a spring disk, the throttle element 10 with the main body 42 formed as a hat-shaped disk also demonstrates different dynamic throttle behavior depending on the position of installation.

Figure 6:
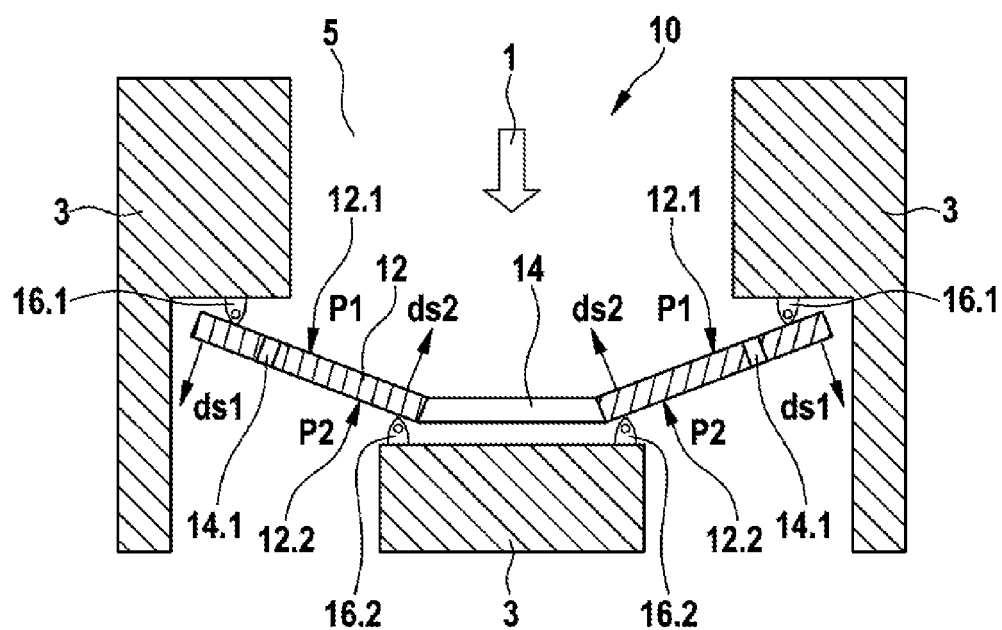

In the exemplary embodiment illustrated in FIG. 6 the resilient main body 12 of the throttle element 10 is formed as a disk spring with a first opening 14, similarly to FIG. 2. In contrast to FIG. 2, the main body 12 formed as a disk spring has a second opening 14.1, however, that has a defined constant flow cross section and is released independently of the differential pressure. In the exemplary embodiment illustrated the second opening 14.1 is introduced as a bore into the resilient disk-shaped main body 12. In addition and/or alternatively thereto, such a second opening 14.1 may also be introduced as a recess into the at least two supports 16.1, 16.2 and/or formed as an annular gap. Furthermore, such a second opening 14.1 with constant cross section may also be introduced into the throttle elements 10 shown in FIGS. 3 to 6.

The throttle behavior of the throttle element 10 can be changed by changing the constant cross section of the second opening 14.1 and/or the rigidity and/or spring characteristic curve and/or load-displacement characteristic curve of the resilient disk-shaped main body 12, 22, 32, 42 and/or the response pressure and/or the bias and/or by changing a stroke delimitation.

The throttle element 10 preferably bears against the supports 16.1, 16.2 in an interlocking manner, whereby a sealing effect is produced in the form of a line seal 17.2 or a surface seal 17.1. FIGS. 7 to 14 show different exemplary embodiments for the contact regions.

Figure 7:
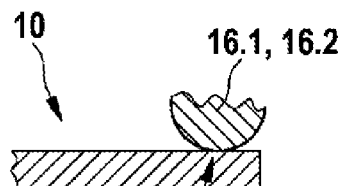
FIGS. 7 to 14 each show a schematic sectional illustration of an exemplary embodiment of a possible seal configuration at supports of the arrangements according to the disclosure for throttling a fluid flow from FIGS. 1 to 6.

As can also be seen from FIG. 7, the throttle element 10 has a planar surface, which forms a surface seal 17.1 with a curved face of the support 16.1, 16.2.

Figure 8:
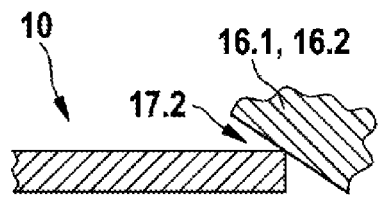

As can also be seen from FIG. 8, the throttle element 10 has a planar surface, wherein an edge of the planar face forms a line seal 17.2 with a planar face of the support 16.1, 16.2.

Figure 9:
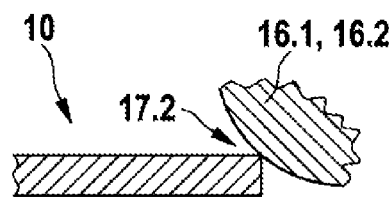

As can also be seen from FIG. 9, the throttle element 10 has a planar surface, wherein an edge of the planar face forms a line seal 17.2 with a curved face of the support 16.1, 16.2.

Figure 10:
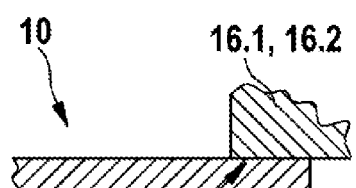

As can also be seen from FIG. 10, the throttle element 10 has a planar surface, which forms a surface seal 17.1 with the planar face of the support 16.1, 16.2.

Figure 11:

As can also be seen from FIG. 11, the throttle element 10 has a curved surface, which forms a surface seal 17.1 with a similarly curved face of the support 16.1, 16.2.

Figure 12:
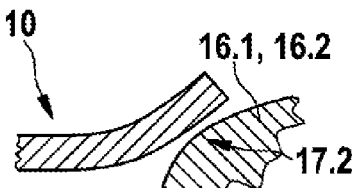

As can also be seen from FIG. 12, the throttle element 10 has a curved surface, which forms a line seal 17.2 with a face of the support 16.1, 16.2 curved oppositely.

Figure 13:
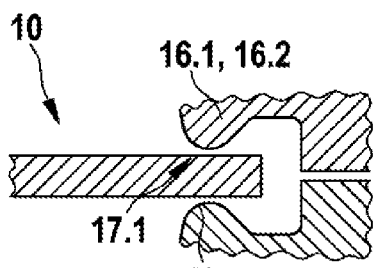

As can also be seen from FIG. 13, the throttle element 10 has a planar surface, which, similarly to FIG. 10, forms a surface seal 17.1 with a curved face of the support 16.1, 16.2. The illustrated throttle arrangement additionally has a stop 18, which delimits the stroke of the throttle element. The service life of the throttle element 10 can thus advantageously be increased. A fluidic end position damper can optimize the opening and noise behavior in the region of this stop 18.

Figure 14:
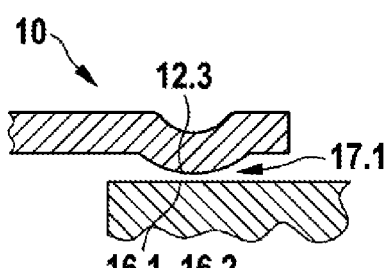

As can also be seen from FIG. 14, the throttle element 10 has a contact protrusion 12.3, which bears against a planar surface of the support 16.1, 16.2 and forms a surface seal 17.1.

Figure 15:
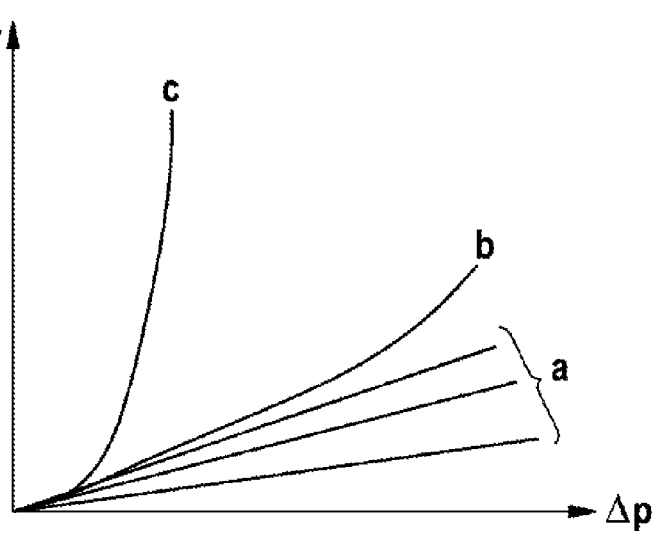
FIG. 15 shows a characteristic curve graph with a plurality of characteristic curves of various arrangements for throttling a fluid flow in order to illustrate the dynamic flow behavior of embodiments of the arrangement according to the disclosure for throttling a fluid flow compared to other arrangements for throttling a fluid flow.

FIG. 15 shows a characteristic curve graph with a plurality of characteristic curves of various arrangements for throttling a fluid flow 1. In FIG. 15 characteristic curves a show the dynamic throttle behavior of throttle arrangements having a constant cross section. A characteristic curve b in FIG. 15 shows the dynamic throttle behavior of a throttle arrangement with a rectangular cross section, of which the width/height ratio has a value in the range from 0.1 to 1. A characteristic curve c in FIG. 15 shows the dynamic throttle behavior of embodiments of the present arrangement according to the disclosure for throttling a fluid flow. As can be seen from the characteristic curve c, embodiments of the present disclosure demonstrate progressive opening behavior or a degressive increase in the flow resistance with increasing flow rate. This advantageously enables heavy throttling at low flow rates as well as a low flow resistance at greater flow rates.

Figure 16:
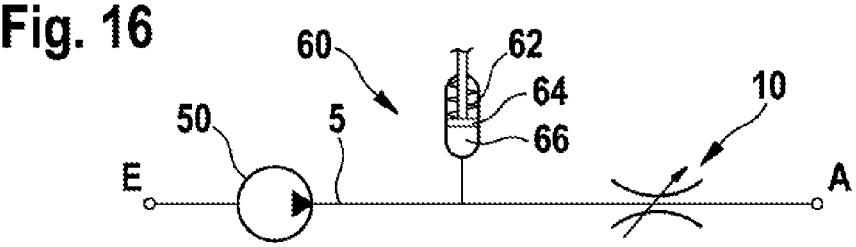
FIGS. 16 to 18 each show a schematic equivalent circuit diagram of an exemplary embodiment of the arrangement according to the disclosure for throttling a fluid flow.
Figure 17:
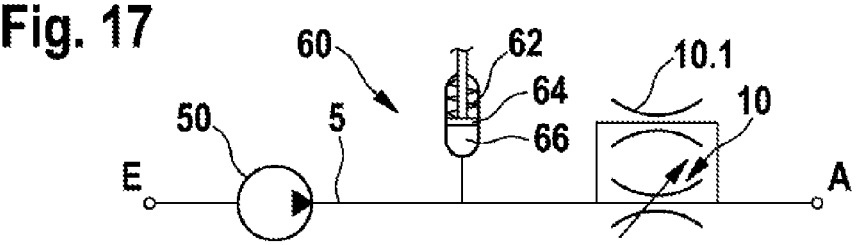
Figure 18:
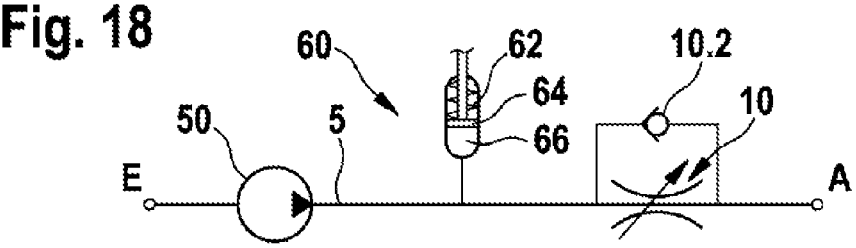

FIGS. 16 to 18 each show a schematic replacement circuit diagram of an exemplary embodiment of the arrangement according to the disclosure for throttling a fluid flow.

As can be seen from FIG. 16, the throttle element 10 in the illustrated exemplary embodiment is arranged between an inlet E and outlet A of a fluid system, after a volume flow source 50 and an element 60 of resilient volume in the direction of flow. The volume flow source 50 may be a reciprocating pump, a gear pump or another fluid element, for example, that causes the volume flow rate to change over time or causes a pulsation. FIG. 19 shows various possible profiles of volume flow rate/time characteristic curves of the volume flow source, which all have a pulsed profile, that is to say a volume flow rate that is not constant over time. The element 60 stores the volume available as a result of the excess pressure at the throttle element 10 in accordance with its pressure/volume characteristic curve. FIG. 20 shows various volume change/pressure characteristic curves of the element 60 of variable volume. In the illustrated exemplary embodiment the element 60 is formed as a piston accumulator with a return spring 62, a piston 64 and a compensation chamber 66, of which the volume can be changed via the piston 64 and the return spring 62 according to the pressure. In addition or alternatively, the resilient volume can be produced for example by the inherent resilience of the fluid system, a gas pressure accumulator, a bellows, a diaphragm spring or similar components, which increase their volume under the action of pressure.

Due to the variable throttle cross section, a greater excess pressure can be generated in the range of small volume flows and the volume of the element 60 of resilient volume can be increased. A smaller residual ripple/amplitude spectrum is thus produced at the outlet A of the fluid system. The losses at the throttle element 10 are minimized as a result of the progressive characteristic curve profile thereof in the range of large volume flows. It is also possible to arrange the throttle element 10 parallel to a constant throttle 10.1 or a check valve 10.2, as can be seen from FIG. 17 or 18.

The disclosure also includes the combination of the throttle element with the valve spring of a check valve arranged before the resilient volume and constant throttle and provided in the form of a leaf spring. FIGS. 21 and 22 show a configuration with a leaf spring and throttle element combined in a single component 10.

FIG. 21 shows a cross section through a rear region of a piston pump 50 according to the disclosure for delivering fluids, comprising an arrangement according to the disclosure for throttling a fluid flow, and FIG. 22 shows a schematic plan view of an exemplary embodiment of a throttle element 72 for the arrangement according to the disclosure for throttling a fluid flow from FIG. 21.

As can be seen from FIGS. 21 and 22, the illustrated piston pump 50 for delivering fluids comprises a piston (not illustrated), a cylinder element 52 and a pressure chamber 53, which is arranged between an inlet valve (not illustrated) and an outlet valve 57 and which is closed by a lid 51, wherein an arrangement according to the disclosure for throttling a fluid flow 1 is provided after the outlet valve 57 in the direction of fluid flow. As can also be seen from FIG. 21, the outlet valve 57 comprises a closing body 57.1 formed as a ball and an outlet valve seat 57.2, and adjusts the fluid flow 1 between an outlet opening 54 in the pressure chamber 53 and at least one outflow opening 55 in the piston pump 50. The throttle element 10 comprises a disk-shaped main body 72, which is arranged between two peripheral supports 16.1, 16.2. The disk-shaped main body 72 is formed as a leaf spring with a spiraled first opening 74 and simultaneously acts as a return element for the closing body 57.1. In addition, an element 60 of variable volume is formed in the region of the lid 51 of the piston pump and has a piston 64, which is supported by a return spring 62 and which changes the volume of the compensation chamber 66.

Embodiments of the present disclosure advantageously enable a reduction of pulsations in fluid systems by means of a variable throttle cross section. Such a throttle arrangement with variable flow cross section is advantageously implemented with the simplest, cost-effective, machine-produced components that can be reliably assembled and with a robust configuration, which is less sensitive to component and assembly tolerances than previously known variable throttles.

The invention claimed is:

1. An arrangement for throttling a fluid flow in a fluid duct, comprising:
 a throttle element arranged in the fluid duct to influence a flow cross section of and within the fluid duct, the throttle element including a resilient disk-shaped main body with an upper side and an underside, wherein:
 the resilient disk-shaped main body is arranged with the upper side and the underside between at least two supports arranged in a fixed position within the fluid duct such that the flow cross section is variably adjustable according to a fluidic pressure difference between the upper side and the underside of the resilient disk-shaped main body acting directly on the main body,
 at least one support of the at least two supports is configured to bear against the upper side of the resilient disk-shaped main body, and
 at least one support of the at least two supports is configured to bear against the underside of the resilient disk-shaped main body.

2. The arrangement as claimed in claim 1, wherein:
 the resilient disk-shaped main body has a first opening configured to allow fluid to flow therethrough, and
 when one of the upper side and the underside of the resilient disk-shaped main body is raised, fluid flows via one of through the first opening in the resilient disk-shaped main body and around the resilient disk-shaped main body.

3. The arrangement as claimed in claim 1, further comprising at least one of:
 an element with a volume that is changeable according to pressure,
 a throttle device with a constant cross section, and
 a check valve, wherein the at least one of the element, throttle device and check valve are arranged so as to be fluidically connected in at least one of series and parallel to the throttle element.

4. The arrangement as claimed in claim 1, wherein:
 the resilient disk-shaped main body is arranged under a defined bias between the at least two supports such that an opening differential pressure is predefined, and
 the at least two supports are arranged at a predefinable distance from one another.

5. The arrangement as claimed in claim 1, wherein the resilient disk-shaped main body is configured to be lifted by the fluidic pressure difference from the at least one support on a side of greater pressure, such that the resilient disk-shaped main body carries out a stroke motion and increases the flow cross section.

6. The arrangement as claimed in claim 1, wherein the resilient disk-shaped main body is configured to bear against the at least two supports in an interlocking manner and form at least one of a surface seal and a line seal.

7. The arrangement as claimed in claim 1, wherein the resilient disk-shaped main body is a return spring for a closing element of a valve.

8. The arrangement as claimed in claim 1, wherein:
 the resilient disk-shaped main body defines at least one opening having a defined constant flow cross section that is open independently of the fluidic pressure difference, and
 the at least one opening is at least one of formed in the resilient disk-shaped main body, formed as a recess in the at least two supports, and formed as an annular gap between the resilient disk-shaped main body and the duct.

9. The arrangement as claimed in claim 8, wherein:
 the throttle element is configured such that changing at least one of the constant flow cross section of the at least one opening, a rigidity, a spring characteristic curve, a load-displacement characteristic curve of the resilient disk-shaped main body, a response pressure, a bias, and a stroke delimitation changes a throttle behavior of the throttle element.

10. A piston pump for delivering fluids comprising:
 a piston;
 a cylinder element;
 a pressure chamber arranged between an inlet valve and an outlet valve and configured to be closed by a lid; and
 a throttle mechanism configured to throttle a fluid flow and arranged after the outlet valve in a direction of the fluid flow, wherein the throttle mechanism is an arrangement configured to throttle the fluid flow including:
 a throttle element arranged in a fluid duct to influence a flow cross section of and within the fluid duct, the throttle element including a resilient disk-shaped main body with an upper side and an underside, wherein:
 the resilient disk-shaped main body is arranged within the duct with the upper side and the underside between at least two supports arranged in a fixed position within the fluid duct such that the flow cross section is variably adjustable according to a fluidic pressure difference between the upper side and the underside of the resilient disk-shaped main body acting directly on the main body,
 at least one support of the at least two supports is configured to bear against the upper side of the resilient disk-shaped main body, and
 at least one support of the at least two supports is configured to bear against the underside of the resilient disk-shaped main body.

11. An arrangement for throttling a fluid flow in a fluid duct, comprising:
 at least two supports arranged in a fixed position within the fluid duct; and
 a throttle element including a resilient disk-shaped main body with an upper side and an underside, wherein
 the main body arranged in the fluid duct between the at least two supports such that, in a resting position, the upper side is supported by at last one of the at least two supports and the underside is supported by at least one other of at least two supports,
 the main body being movable away from the resting position due to a fluidic pressure difference between the upper side and the underside of the main body acting directly on the main body, such that;
a greater fluidic pressure acting directly on the upper side of the main body causes at least part of the main body to move away from the at least one of the at least two supports; and
a greater fluidic pressure acting directly on the underside of the main body causes at least part of the main body to move away from the at least one other of the at least two supports; and
a flow cross section of and within the fluid duct is defined between the main body and the duct and is determined by a position of the main body relative to the at least two supports, such that the flow cross section varies with the pressure difference.

12. The arrangement as claimed in claim 11, wherein:
the resilient disk-shaped main body has a first opening configured to allow fluid to flow therethrough, and
when one of the upper side and the underside of the resilient disk-shaped main body is raised, fluid flows via one of through the first opening in the resilient disk-shaped main body and around the resilient disk-shaped main body.

13. The arrangement as claimed in claim 11, further comprising at least one of:
an element with a volume that is changeable according to pressure,
a throttle device with a constant cross section, and
a check valve, wherein the at least one of the element, throttle device and check valve are arranged so as to be fluidically connected in at least one of series and parallel to the throttle element.

14. The arrangement as claimed in claim 11, wherein:
the resilient disk-shaped main body is arranged under a defined bias between the at least two supports such that an opening differential pressure is predefined, and
the at least two supports are arranged at a predefinable distance from one another.

15. The arrangement as claimed in claim 11, wherein the resilient disk-shaped main body is configured to bear against the at least two supports in an interlocking manner and form at least one of a surface seal and a line seal.

16. The arrangement as claimed in claim 11, wherein the resilient disk-shaped main body is a return spring for a closing element of a valve.

17. The arrangement as claimed in claim 11, wherein:
the resilient disk-shaped main body defines at least one opening having a defined constant flow cross section that is open independently of the fluidic pressure difference, and
the at least one opening is at least one of formed in the resilient disk-shaped main body, formed as a recess in the at least two supports, and formed as an annular gap between the resilient disk-shaped main body and the duct.

18. The arrangement as claimed in claim 17, wherein:
the throttle element is configured such that changing at least one of the constant flow cross section of the at least one opening, a rigidity, a spring characteristic curve, a load-displacement characteristic curve of the resilient disk-shaped main body, a response pressure, a bias, and a stroke delimitation changes a throttle behavior of the throttle element.

* * * * *